(No Model.)

H. H. DOLL.
CAR FENDER.

No. 587,430.  Patented Aug. 3, 1897.

WITNESSES
James F. Duhamel
J. C. Tappan

INVENTOR.
Horace H. Doll.
By John Wedderburn
Attorney

THE NORRIS PETERS CO., PHOTO-LITHO., WASHINGTON, D. C.

UNITED STATES PATENT OFFICE.

HORACE H. DOLL, OF PHILADELPHIA, PENNSYLVANIA.

CAR-FENDER.

SPECIFICATION forming part of Letters Patent No. 587,430, dated August 3, 1897.

Application filed September 10, 1896. Serial No. 605,392. (No model.)

*To all whom it may concern:*

Be it known that I, HORACE H. DOLL, a citizen of the United States, residing at Philadelphia, in the county of Philadelphia and State of Pennsylvania, have invented certain new and useful Improvements in Car-Fenders; and I do hereby declare the following to be a full, clear, and exact description of the invention, such as will enable others skilled in the art to which it appertains to make and use the same.

My invention relates to car-fenders.

My object is to provide a car-fender of novel and improved construction which will be adapted to more satisfactorily trip the person or obstacle without injury thereto and to safely hold the same.

A further object is to provide a fender of novel construction which will be operated close to the surface of the track, so that it will be impossible for the object to get under the wheels of the car; and a still further object is to provide a fender which will be adapted to freely swing when going around a curve, and also one which can be folded into compact arrangement whenever desirable.

Having these objects in view, my invention consists of a car-fender comprising certain improved features and novel combinations appearing more fully in the following description, the appended claims, and the accompanying drawings, in which—

Figure 1:
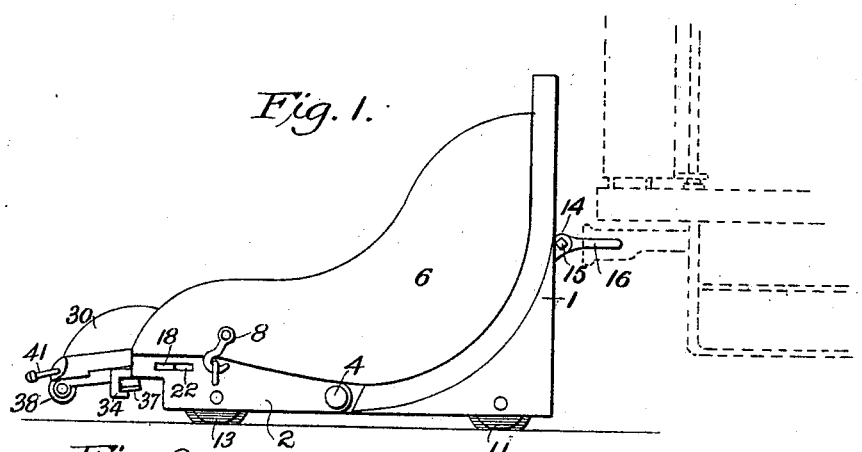
Figure 2:
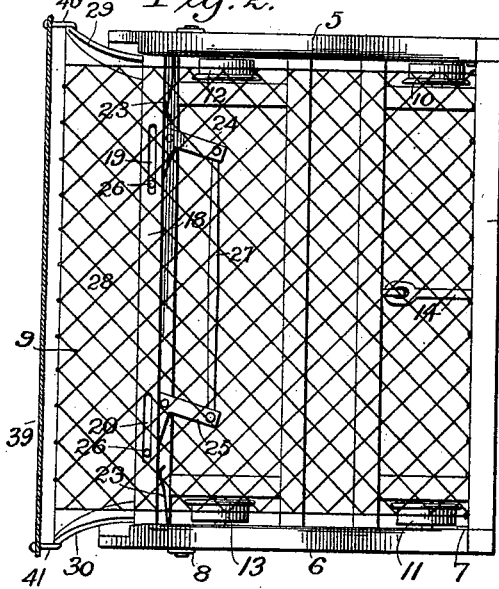
Figure 3:
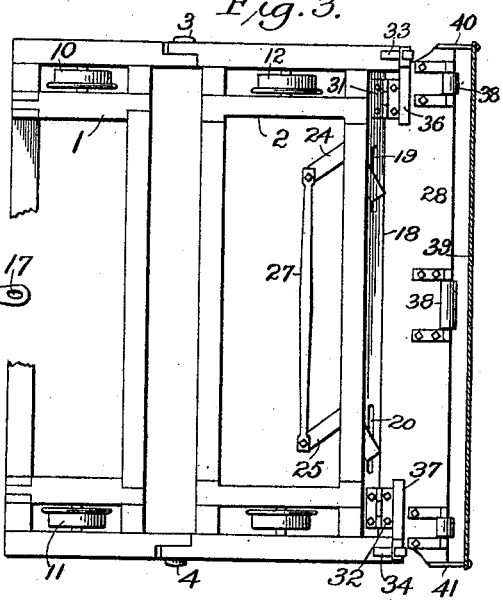
Figure 4:
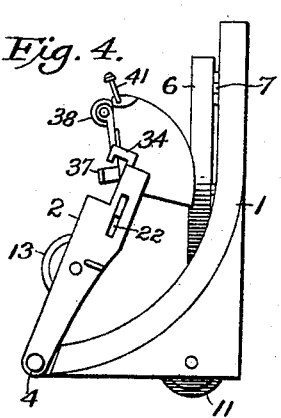

Figure 1 is a side elevation, dotted lines representing the trip after it has been operated; Fig. 2, a plan view; Fig. 3, a bottom view, and Fig. 4 a view showing the fender folded.

The numeral 1 designates the main framework of the fender, and 2 the auxiliary framework. These two are hinged together on bolts 3 and 4, so that they can be folded together, and, if desirable, the bolts can be completely removed, so that they may be separated. The main framework has a rear upwardly-extending portion which lies in front of the detacher of the car.

At 5 and 6 are shown two curved sides, each of which is connected to the main framework by hinges 7 and to the auxiliary framework by a hook-and-eye connection 8. A piece of netting 9 is connected to the bottom and back and adapted to form a bed, which receives the object caught by the fender.

The numerals 10 and 11 designate wheels which are journaled in the main frame, and 12 and 13 designate wheels that are journaled in the auxiliary frame, all of said wheels being adapted to run on the rails, so that the fender is kept close to the latter.

The numeral 14 designates a link which is connected by an eye to a cross-bar of the main frame, and the rear end of this coupling-bar is bifurcated and provided with a coupling-pin 15.

The numeral 16 designates another link which is pivoted on said pin, having its end received in the bifurcated portion, and is provided with a pin-opening 17, adapted to receive the coupling-pin of the car. It will thus be seen that the fender can move both vertically and horizontally in relation to the car, and hence it will be adapted to properly follow the track when going around curves.

The numeral 18 designates a bar which is provided with slots 19 and 20. Said bar has reduced ends which are received in slots 21 and 22, made in the forward portions of the side pieces of the auxiliary frame, so that said bar will be adapted for front and rear horizontal movement.

The numeral 23 designates a ribbon-spring which has its ends located in the slots in the auxiliary frame, and this spring presses against the rear edge of the bar 18, so that it is normally forced forward.

The numerals 24 and 25 designate bell-crank levers which are pivoted to the front cross-bar of the auxiliary frame, and the forward arm of each lever is provided with a vertically-extending pin 26, said pins being received in the slots 19 and 20.

The numeral 27 designates a link which connects the other arms of the bell-crank lever. The purpose of this construction is to insure an even backward and forward movement of the bar 18, so that neither end thereof will be in advance or in the rear of the other end.

At 28 is shown a trip-board which is provided with curved sides 29 and 30, that are adapted to fit close to the curved sides 5 and 6. At 31 and 32 are shown hinges which connect this trip-board with the bar 18, so that said board can drop.

Depending brackets 33 and 34 are connected to the forward ends of the sides of the auxiliary frame, and 36 and 37 represent bent tongues which are connected to the trip-board and normally adapted to rest on the lower ledge of said bracket, said lower ledge pointing rearwardly. A series of rollers 38 are journaled in suitable irons connected to the under face of the trip-board, so that when the latter is dropped it will move along easily.

At 39 is shown a belt which is connected to arms 40 and 41, that extend forward from the front edge of the trip-board, said band or belt being adapted to cushion the impact of the trip-board with the object.

The operation is as follows: When the object is struck, the impact is cushioned by the band, which is pushed against the front edge of the trip-board. The trip-board being pushed upward against the action of the ribbon-spring the tongues come out of engagement with the brackets and the board drops by gravity, so that it rolls along close to the surface of the ground and track, and hence it will be impossible for the object to roll under the fender. The object is then delivered onto the netting, where it is safely held. The fender is again made ready for use by lifting the trip-board and allowing the tongues to again rest on the ledges of the brackets.

The fender can be folded into compact space by disengaging the hook-and-eye connections between the sides 5 and 6 and the auxiliary frame. Said sides can then be folded together and the auxiliary frame swung up against them.

There are many slight and immaterial changes that might be resorted to in constructing the different parts of the present invention, and hence it is to be understood that I do not limit myself to the precise construction herein shown and described, but consider that I am entitled to all such variations as properly come within the spirit and scope of the invention.

Having thus described my invention, what I claim as new, and desire to secure by Letters Patent, is—

1. In a fender, the combination with a main frame adapted for connection to the car, of a forwardly-extending auxiliary frame hinged to the main frame and adapted to be swung vertically and backwardly, rollers or wheels journaled in the main and auxiliary frame being adapted to run on the track, inwardly-foldable sides hinged to the main frame, a netting or other flexible device constituting the bed of the fender, and means for keeping the auxiliary frame and sides extended.

2. In a fender, the combination with a fender-body, of a spring-pressed trip-board having slots and guided by the fender-body, bell-crank levers pivoted to the fender-body and provided with portions that project into said slots, and a link connecting the bell-crank lever.

3. In a fender, the combination with a fender-body, of a spring-pressed bar movable in relation thereto being provided with slots, bell-crank levers pivoted to the fender-body and provided with portions which project into said slots, a link connecting the bell-crank levers, a trip-board hinged to the bar, and a detachable connection between the trip-board and the fender-body.

4. In a fender, the combination with a fender-body provided with slots, of a bar movable in said slots and also provided with slots, bell-crank levers pivoted to the fender-body and having pins that project into the slots of the bar, a link connecting the bell-crank levers, a trip-board hinged to the bar, brackets connected to the fender-body, tongues connected to the trip-board and adapted to rest on said brackets, and rollers journaled to the trip-board.

In testimony whereof I have signed this specification in the presence of two subscribing witnesses.

HORACE H. DOLL.

Witnesses:
HORACE H. GOTTSHALK,
F. H. ABELES.